(12) United States Patent
Chaar et al.

(10) Patent No.: US 6,857,020 B1
(45) Date of Patent: Feb. 15, 2005

(54) APPARATUS, SYSTEM, AND METHOD FOR MANAGING QUALITY-OF-SERVICE-ASSURED E-BUSINESS SERVICE SYSTEMS

(75) Inventors: Jarir Kamel Chaar, Tarrytown, NY (US); Rong Nickle Chang, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 09/716,862

(22) Filed: Nov. 20, 2000

(51) Int. Cl.[7] ............................................. G06F 15/173
(52) U.S. Cl. ...................... 709/226; 709/223; 709/224; 709/225; 718/104
(58) Field of Search ................................ 709/200–310; 718/104

(56) References Cited

U.S. PATENT DOCUMENTS

| | | | | |
|---|---|---|---|---|
| 6,147,975 A | * | 11/2000 | Bowman-Amuah | 370/252 |
| 6,304,892 B1 | * | 10/2001 | Bhoj et al. | 709/202 |
| 6,490,621 B1 | * | 12/2002 | Forget et al. | 709/224 |

* cited by examiner

Primary Examiner—Nabil Elhady
(74) Attorney, Agent, or Firm—Louis J. Percello; Harrington & Smith, LLP (57) ABSTRACT

One or more SLA-specified service-level monitors and/or one or more provider-owned service-level management monitors are used by the invention to monitor one or more quality measures of one or more QoS-assured service systems and to generate one or more service-level monitoring events when the monitored system does not conform to the respective quality measures. The invention includes a cross-SLA event manager that receives the monitoring events and determines which one or more SLA contracts are affected by the events. Then one or more SLA management objects (SMOs) track the SLA-specific events generated by the event manager according to each of the respective SLA contracts. The SMOs also determine how to allocate/deallocate/configure SLA management resources and/or to determine the effect of these changes on the service system operation to assure the contracted quality of service. A cross-SLA resource manager handles the SMOs' resource allocation requests and optimizes the allocation of available resources per the service provider's SLA management objectives. Finally, a SMO manager manages the execution of SMOs and facilitates the integration and management of service system testing-time and production-time activities.

21 Claims, 9 Drawing Sheets

APPARATUS, SYSTEM, AND METHOD FOR MANAGING QUALITY-OF-SERVICE-ASSURED E-BUSINESS SERVICE SYSTEMS

FIELD OF THE INVENTION

This invention relates to service level agreement (SLA) management, particularly the operations management of e-business SLAs. More specifically, the invention relates to managing quality-of-service-assured e-business service systems.

BACKGROUND OF THE INVENTION

Many companies in the world have started participating in the Internet-based global e-business economy to ensure a prosperous future. Rapid innovations in Web computing technologies and applications coupled with a serious worldwide shortage of information technology skills have made it increasingly desirable for the companies to outsource their network-based e-business service systems and to manage those systems via service level agreements (SLAs). In general, a SLA is a monetary, legal contract that specifies the minimum expectations and obligations that exist between a service provider and a service recipient. The SLA for a quality of service (QoS) assured e-business service system would include, among others, the components listed below (see Best Practices Committee of Application Service Provider Industry Consortium, A Guide to Service Level Agreements, 2000; Hiles, A., "An Overview of Service Level Agreements: What They Can and Cannot Do," The Complete Guide to IT Service Level Agreements: Matching Service Quality to Business Needs, 1999/2000 Edition, pp. 1—23, 1999; Verma, D., "Service Level Agreements Overview", Supporting Service Level Agreements on IP Networks," MacMillan Technology Series, pp. 5—13, 1999):

Description of service

Start date and duration of service

Pricing and payment terms

Terms and conditions for service installation, revisions, and termination

Planned service maintenance windows

Customer support procedures and response time

Problem escalation procedures

Security management requirements (e.g., data security management, user account management, user authentication and authorization processes, disaster recovery, etc.)

Functional requirements of the service system

Acceptance testing criteria, i.e., QoS requirements that must be met before the service can be deployed for production use. These criteria could be stated in terms of, for example, benchmark-based transaction throughput performance, business-oriented synthetic transaction processing performance, service system scalability, fail-over performance, backup restoration performance, service usability, and/or service system configurations (e.g. computer main memory size).

Terms and conditions for the service-level management objectives that must be assured when the contracted service is in production mode. These objectives can be made on service system availability/reliability, transaction service time, end-to-end transaction response time, network connection bandwidth, change latency of on-demand capacity allocation, problem resolution response time, etc.

Compared with best-effort based e-business service contracts, QoS-assured e-business SLAs feature the inclusion of production-time QoS assurances with refund policies for service level violations (i.e., penalties for non-performing). The refund policies can be stated relative to the service cost (e.g., credit the customer one day of the service cost if the service is unavailable more than 10 minutes a day) or in absolute terms (e.g., cut a check of one thousand dollars to the customer if the service is unavailable more than 10 minutes a day).

In order to objectively determine service-level violations, each service-level specification in an e-business SLA would include the components listed below:

Location of QoS measurement point (a.k.a., service-level specification reference point), which can be in the service system infrastructure (e.g., network access routers, Internet firewall servers, application hosting computers, operating systems, etc.) or in the service system software (e.g., middleware, application servers, browsers, etc.)

Service-level monitoring and reporting specifications, including the tools and methodologies that will be used to perform the required service-level monitoring and reporting tasks for the QoS assurance Workload acceptance control (or workload admission control) mechanisms and policies (e.g., for performance related QoS assurances)

Refund policies for service-level violations

Before adding a measurable QoS assurance to a specific e-business SLA, the service provider must ensure adequate service-level-management technologies and processes can be deployed to manage the financial risk of service-level violations (which can be automatically detected via SLA-specified service-level monitors). It may turn out that the assurance cannot be made because, for example, (1) the APIs (Application Programming Interfaces) used for creating and integrating the service software components provide insufficient service-level management support, (2) the cost of deploying the needed service-level management software and changing existing service management process for the new QoS assurance cannot be justified, or (3) the new QoS assurance would introduce nontrivial impact to the other terms and conditions in the SLA such that the possibility of service-level violations and/or the cost of justifying the resulting SLAs would be significantly increased. The decision making process depends heavily on the design and implementation of the provider-owned e-business SLA manager.

All of the prior art e-business SLA managers are developed with the goal of preventing service-level violations (see Best Practices Committee of Application Service Provider Industry Consortium, A Guide to the ASP Delivery Model, 2000; Hiles, A., "Keys to Measuring and Monitoring Service: Designing and Implementing a SLA," The Complete Guide to IT Service Level Agreements: Matching Service Quality to Business Needs, 1999/2000 Edition, pp. 67—122, 1999; Verma, D., "A General SLA Architecture", Supporting Service Level Agreements on IP Networks," MacMillan Technology Series, pp. 137—160, 1999). Besides SLA-specified service-level monitors, provider-owned service-level management monitors are usually used by the prior art e-business SLA managers to proactively manage QoS-assured e-business service systems, especially when SLA-specified service-level monitors cannot feed the provider's e-business SLA manager the-service quality measurement data in a timely fashion. Implementation and deployment details of these provider-owned service-level management monitors are not documented in the SLA and are not exposed to the customer. Moreover, the provider usually do not negotiate with the customer on the mechanisms and policies it uses for meeting its own technical requirements on service-level management objectives (e.g., minimum service availability, maximum transaction response time, minimum service system throughput, minimum and maximum network bandwidth, etc.). The provider ensures SLA conformance by integrating its e-business SLA manager with SLA-specified service-level monitors; provider-determined service-level management monitors; service system management agents (e.g., router/middleware configuration change agents, server allocation/deallocation agents, application software installation agents, problem determination agents, third-party service management agents, sub-SLA management agents, etc.); and operations management staff Operations management staff are notified whenever the SLA manager does not know how to deal with an abnormal condition detected via the monitors.

PROBLEMS WITH THE PRIOR ART

Prior art e-business SLA managers are developed mainly to determine service-level violations and/or to determine trends of service-level violations per provider-determined technical requirements on service-level management objectives (e.g., minimum service availability, maximum transaction response time, minimum service system throughput, minimum and maximum network bandwidth, etc.). They do not know the business impact (e.g., revenue loss) a specific service-level violation would create, though they could detect and/or predict the violation. They cannot optimize the usage of the provider's e-business SLA management resources (e.g., network connection bandwidth, servers, disk storage, software, customer support personnel, operations management staff, service management agents, etc.) to help the provider maximize its profits or its customer satisfaction because they are ignorant of service quality related non-technical SLA components (e.g., pricing terms, refund policy for service-level violations, problem escalation procedures, customer support procedures and response time, etc.).

Prior art SLA managers cannot determine and execute, in a timely manner, adequate service management actions and related business processes for the provider because they do not have sufficient access to service-level management data. They do not know what service management actions should be taken when abnormal conditions are detected via the monitors. Skillful operations management staff are usually notified to handle those abnormal conditions and are responsible for executing the needed service management actions, though some ad hoc approaches may be used to link specific monitoring events (e.g., machine failure) to system management agents or mechanism (e.g., failover management middleware). Such best-effort based people intensive approach to managing the operations of e-business SLAs will soon lead the provider to face cost-efficiency and shortage of skills issues soon in light of the demand for (and the increasing complexity of) QoS-assured e-business service systems.

OBJECTS OF THE INVENTION

An object of this invention is an improved apparatus, system, and method for managing quality of service (QoS) assured e-business service systems.

An object of this invention is an improved apparatus, system, and method for managing the execution of QoS-assured e-business applications running atop one or more e-business hosting platforms.

An object of this invention is an improved apparatus, system, and method for determining and executing service management actions in support of the operations management of e-business SLAs.

An object of this invention is an improved e-business SLA management apparatus, system, and method that optimize the usage of e-business SLA management resources.

An object of this invention is an improved e-business SLA management apparatus, system, and method that support planned and/or on-demand change of QoS-assurances and service-level management tasks.

An object of this invention is an improved e-business SLA management apparatus, system, and method that support planned and/or on-demand change of QoS-assurances and service-level management tasks with service-level assurances on the change latency.

An object of this invention is an improved e-business SLA management apparatus, system and method that facilitate the integration and management of service system testing-time and production-time activities.

SUMMARY OF THE INVENTION

The present invention is an e-business service level agreement (SLA) management apparatus, system, and method for managing quality of service (QoS) assured e-business service systems. One or more SLA-specified service-level monitors and/or one or more provider-owned service-level management monitors are used by the invention to monitor one or more quality measures of one or more QoS-assured service systems and to generate one or more service-level monitoring events when the monitored system does not conform or might soon not conform to the respective quality measure. The invention includes a cross-SLA event manager (CSEM) that receives the monitoring events, determines which one or more SLA contracts are affected by the events, and generates one or more SLA-specific service-level management events to one or more SLA-specific SLA management objects (SMOs). The SMOs track the events according to each of the respective SLA contracts, determine how to allocate/deallocate/configure SLA management resources and/or determine the effect of those resource management actions on the service system operation to assure the contracted quality of service. When more than one SMO requests a resource, such as to prevent or alleviate a QoS violation, resources are allocated based at least in part on a financial impact assessment.

In a preferred embodiment, the actions can be performed by SMOs themselves, operations management staff, and/or service management agents. The SMOs submit one or more resource allocation requests to cross-SLA resource manager (CSRM) when they need one or more additional SLA management resources so that the resource manager can optimize the allocation of available resources per the service provider's overall SLA management objectives. The SMOs are managed by a SMO manager which facilitates the integration and management of service system testing-time and production-time activities.

BRIEF DESCRIPTION OF THE FIGURES

The foregoing and other objects, aspects, and advantages will be better understood from the following non limiting detailed description of preferred embodiments of the invention with reference to the drawings that include the following.

DETAILED DESCRIPTION OF THE INVENTION

The present invention is an improved apparatus, system, and method for managing quality of service (QoS) assured e-business service systems. It discloses an e-business SLA manager that could (1) manage the execution of QoS-assured e-business applications running atop one of more e-business hosting platforms; (2) determine and execute service management actions in support of the operations management of e-business SLAs; (3) optimize the usage of e-business SLA management resources per the service provider's overall SLA management objectives; (4) support planned and/or on-demand change of QoS-assurances and service-level management tasks with service-level assurances on the change latency; and (5) facilitate the integration and management of service system testing-time and production-time activities.

The disclosed SLA manager comprises one Cross-SLA Event Manager (CSEM), one SLA Management Object (SMO) for each established SLA contract, one Cross-SLA Resource Manager (CSRM) and one SMO Manager. The Cross-SLA Event Manager processes service-level monitoring events generated by one or more SLA-specified service-level monitors and/or one or more provider-determined service-level management monitors, and use SMO-registered event handlers to generate SMO-specific service-level management events.

The monitors monitor one or more quality measures of one or more monitored service systems and generate one or more service-level monitoring events when the monitored system does not conform or might soon not conform to the respective quality measures. The quality measures include any one or more of the following: monitored service system availability/reliability, monitored transaction service time, monitored end-to-end transaction response time, monitored network connection bandwidth, monitored change latency of on-demand capacity allocation, and monitored problem resolution response time.

Every SMO supports the operations management of the associated SLA contract per its SLA management data. It determines and executes service management actions (with support for planned and/or on-demand change of QoS assurances and service-level management tasks) for each of the service-level management events (or SMO events) it receives from CSEM. It also acquires and/or releases SLA management resources per provider-determined SLA management objectives for the associated SLA contract. The actions can be performed by itself, one or more operations management staff, and/or one or more service management agents. The service management agents include any one or more of the following: router/middleware configuration change agents, server allocation/deallocation agents, application software installation agents, problem determination agents, third-party service management agents, and sub-SLA management agents.

Compared with prior art data models for capturing SLA management data, the SMO data model features the inclusion of Service Packages, Service Package Transition Triggers, and terms and conditions for handling those triggers. Every Service Package captures not only terms and conditions for the associated SLA under some specific conditions (e.g. time of the day, day of the week, and workload conditions, etc.), but also provider-determined service-level management data like mappings of SMO events to service management action plans. There is only one active Service Package at any time for each SLA contract. The SMO data model enables SMOs to support planned and/or on-demand change of QoS assurances and service-level management tasks with service-level assurances on the change latency.

The Cross-SLA Resource Manager handles resource allocation requests submitted by SMOs and optimizes the allocation of available computing and people resources based upon the provider's SLA management objectives for all of the established SLA contacts. In the preferred embodiment, quantitative business impact assessment for each resource allocation request is performed by the submitting SMO, and is sent to CSRM as a numeric attribute of the request. The attribute is a function of estimated amount of profit/revenue decrease if the request cannot be honored in a specific period of time. In alternative embodiments, the assessment can be made by CSRM (with or without input from the submitting SMO). The assessment function could also include non-monetary parameters such as customer satisfaction related measurements (e.g., number of trouble tickets that have been issued for the SLA), membership class of the SLA customer (e.g., gold customer vs. regular customer), etc.

The SMO Manager as well as the SMOs makes it easier for the service provider to integrate and manage service system testing-time and production-time activities. The SMO Manager manages the execution of SMOs by controlling the transitions of their states, which structure both testing-time and production-time SMO management activities. If a SMO terminates its execution unexpectedly (e.g. due to unexpected machine crashes), the SMO Manager would attempt to restore the SMO's execution from an appropriate SMO state.

For example, a Web hosting SLA may require the service provider to guarantee, among others, the minimum availability of a Web server system which comprises one or more Web servers and presents to the Web client applications (e.g., Web browsers) on the Internet as a single Web site. The SLA may also specify a trusted third party to monitor the availability measure of the Web server system by fetching a specific URL from the Web site via the HTTP protocol every 10 minutes. In order to proactively assure the availability of the contracted Web server systems, the provider may use one or more service-level management monitors that use the Internet "ping" protocol to check if the server machines allocated to all of the SLA contracts are up every 3 minutes. When a server machine fails, one of the service-level management monitors would send the CSEM a machine failure event. The CSEM then figures out the SLA to which the server machine is currently assigned to, and sends a machine-failure service-level management event to the associated SMO. The SMO then composes a Web server allocation request for the affected SLA with a business impact assessment value calculated based upon the SLA's refund policies for service-level violations on Web site availability and the number of server machines that are still up and running for the SLA. If the request is honored by the CSRM, the SMO executes a server allocation action via a Web server installation agent and ensures successful completion of the action.

Figure 1:
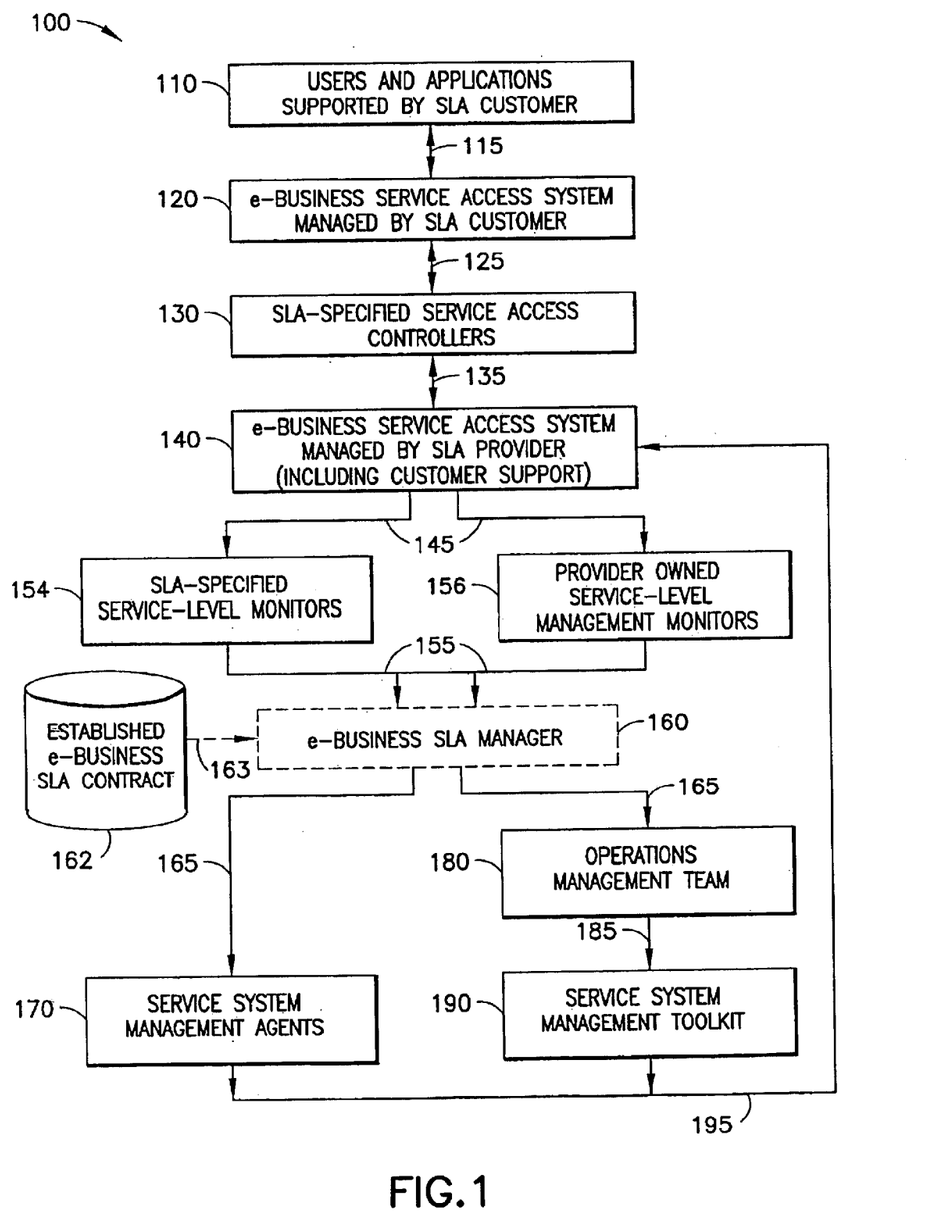
FIG. 1 is a block diagram of the e-business service level agreement (SLA) management framework in which the present invention is used in a non limiting preferred embodiment where each quality of service (QoS) assured e-business service is delivered through a dedicated service system, and is supported by a dedicated operations management team.

FIG. 1 is a block diagram of the e-business SLA management framework in which the present invention is used in a non limiting preferred embodiment where each QoS-assured e-business service is delivered through a dedicated service system, and is supported by a dedicated operations and management team. Since resource sharing mechanisms and policies need not be included in SLAs, this framework also provides the customer and the provider an agreeable abstraction of the service management system and help them to negotiate SLA terms and conditions. After all, the customer should be able to understand the QoS assurances made by the provider well by assuming the managed service is delivered via dedicated resources.

The e-business SLA management framework 100 comprises an established e-business SLA contract (162), users and applications supported by SLA customer (10); an e-business service access system managed by SLA customer (120); SLA-specified service access controllers (130) and service-level monitors (154); and computing and people resources managed by SLA provider (140, 156, 160, 170, 180, 190). The bi-directional arrows (115, 125, 135) show the service access flow. The directional ones with solid lines (145, 155, 165, 185, 195) illustrate service management flow. The directional arrow with dotted line (163) is a data access flow.

SLA users and applications (110) access the QoS-assured e-business service system (140) through the service access system managed by SLA customer (120) when the customer wants to control access to the contracted service (e.g., via user registration and sign-on processes) or to facilitate such access (e.g., via service access gateways). The SLA customer could let SLA users and applications (110) directly access the provider-managed e-business service system (140) when appropriate. For example, most Web hosting customers let Internet users access their outsourced Web sites directly for unprotected Web pages. If the users want to gain access to protected Web objects, they would normally need to go through a security/entitlement management system managed by the SLA customer. The SLA customer itself can also be a user of the contracted service.

The service access controllers (130) are specified in SLA when workload control is necessary for the provider to guarantee performance related service-level management objectives like transaction service time. The controllers could be managed by SLA customer, SLA provider, and/or a trusted third party.

The SLA-specified service-level monitors (154) measure the quality of the outsourced e-business service system (140) at various QoS measurement points defined in the SLA. They may or may not feed the measured data to the e-business SLA manager (160) in real time. Similar to the service access controllers (130), they could be managed by SLA customer, SLA provider, and/or a trusted third party.

The provider-owned service-level management monitors (156) enable SLA provider to proactively manage the quality of managed e-business service system (140), including the quality of customer support. The provider has full control over the development, deployment and management details of these monitors.

The disclosed e-business SLA manager (160) determines and executes service management action plans based upon the terms and conditions specified in the established e-business SLA contract (162) and the monitoring events generated by SLA-specified service-level monitors (154) and/or provider-owned service-level management monitors (156). Each action plan comprises a series of service management actions that could be performed by the e-business SLA manager itself, provider-determined service system management agents (170) and/or operations management team (180). Operations management team usually use a service management toolkit (190) to perform service management actions.

Figure 2:
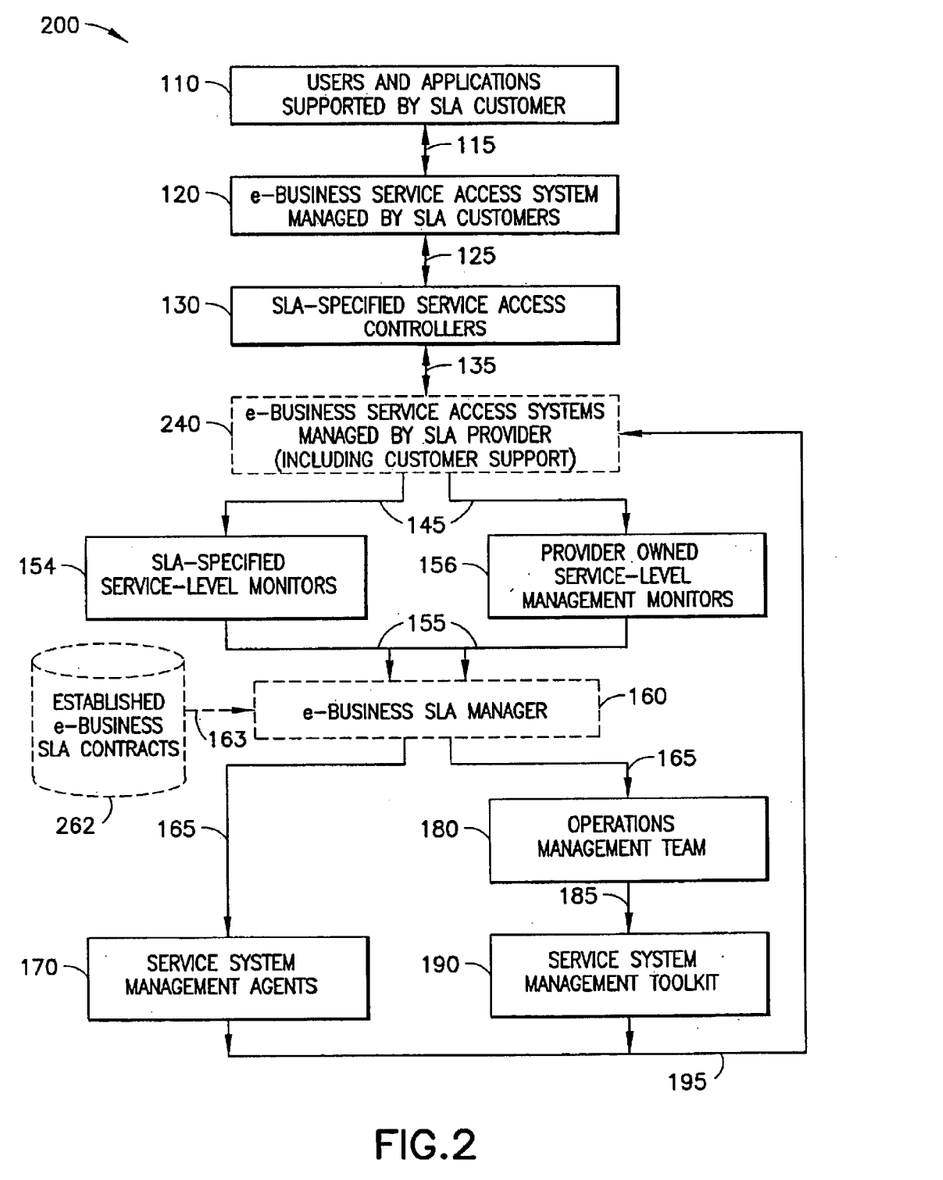
FIG. 2 is a block diagram of an alternative e-business SLA management framework which includes the disclosed e-business SLA manager where QoS-assured e-business services are delivered through several service systems, and are supported by a single operations management team.

FIG. 2 is a block diagram of an alternative e-business SLA management framework which includes the disclosed e-business SLA manager (160) where QoS-assured e-business services are delivered through several service systems (240), and are supported by a single operations management team (180). Each of the service is associated with a SLA contract. Terms and conditions for all of the established e-business SLA contracts (262) are available to the disclosed e-business SLA manager (160). Note that blocks having the same number as those in FIG. 1 perform the same function as that described in FIG. 1.

Figure 3:
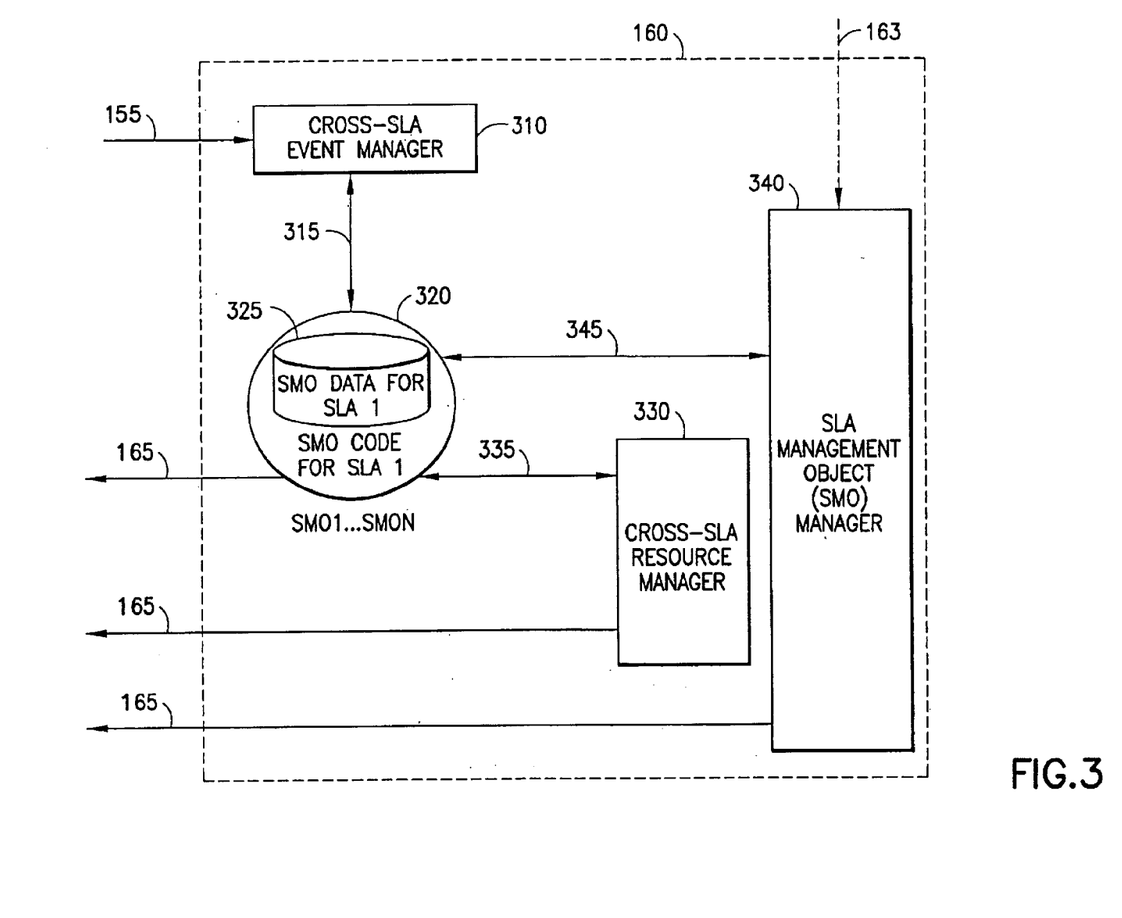
FIG. 3 is a block diagram showing the components of the disclosed e-business SLA manager.

FIG. 3 is a block diagram showing the components of the disclosed e-business SLA manager (160): Cross-SLA Event Manager (CSEM) 310, SLA Management Objects (SMOs) 320, Cross-SLA Resource Manager (CSRM) 330, and SLA Management Object Manager (SMO Manager) 340. The bi-directional arrows 315, 335, and 345 show the interactions between those components. The Cross-SLA Event Manager processes service-level monitoring events (155) sent by SLA-specified service-level monitors or provider-determined service-level management monitors, and use SMO-registered event handlers to generate SMO-specific service-level management events (315). Every SLA Management Object manages the execution of one and only one established SLA contract per its service management data (i.e., SMO Data 325). The Cross-SLA Resource Manager optimizes the utilization of computing and people resources for the provider based upon terms and conditions of all of the established SLA contracts. The SMO Manager manages the execution (or life cycle) of SLA Management Objects.

Figure 4:
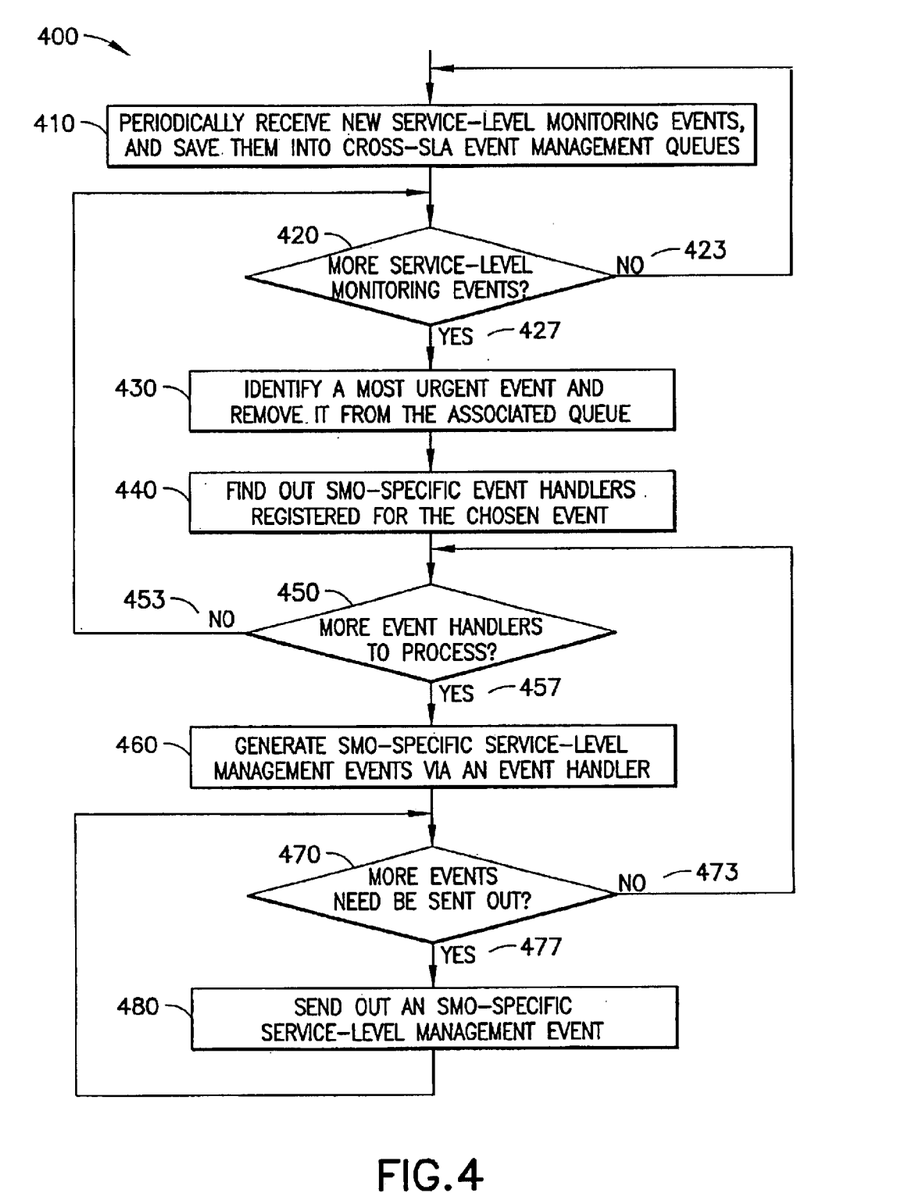
FIG. 4 is a flow chart showing one preferred series of method steps performed by the Cross-SLA Event Manager (CSEM) component of the disclosed e-business SLA manager for handling service-level monitoring events and determining which one or more SLA contracts (each of which governs the use of one or more of the monitored systems) are affected by the events.

FIG. 4 is a flow chart showing one preferred series of method steps performed by the Cross-SLA Event Manager (CSEM) component of the disclosed e-business SLA manager for handling service-level monitoring events and determining which one or more SLA contracts (each of which governs the use of one or more of the monitored systems) are affected by the events. By executing process 400, CSEM prioritizes the processing of service-level monitoring events and generates SMO-specific service-level management events. The process begins with step 410, which periodically receives and logs new service-level monitoring events and save them into cross-SLA event management queues via a multilevel priority queueing scheme. CSEM then enters loop 420 and processes a queued service-level monitoring event in each iteration of the loop (via branch 427). The loop is controlled by step 420, which tests whether or not all of the event queues are empty. If there is an event in the queues, branch 427 is taken. After all of the queued events are processed, the loop terminates and branch 423 is taken.

The queued events are selected for processing based upon their priorities. In step 430, CSEM chooses a most urgent queued event, and removes it from the event queues. CSEM then finds out SMO-specific event handlers registered for the chosen event in step 440. Each of the event handlers is invoked in loop 450 (via branch 457) to generate zero, one, or more SMO-specific service-level management events (step 460). After all of the event handlers are invoked, the loop terminates and branch 453 is taken.

After a set of SMO-specific service-level management events are generated by a specific event handler in step 460, CSEM enters loop 470 (via branch 477) to send them out. The loop terminates (and branch 473 is taken) when all of the generated events have been sent out. In step 480, CSEM sends out a service-level management event to the SMO associated with the event handler.

Figure 5:
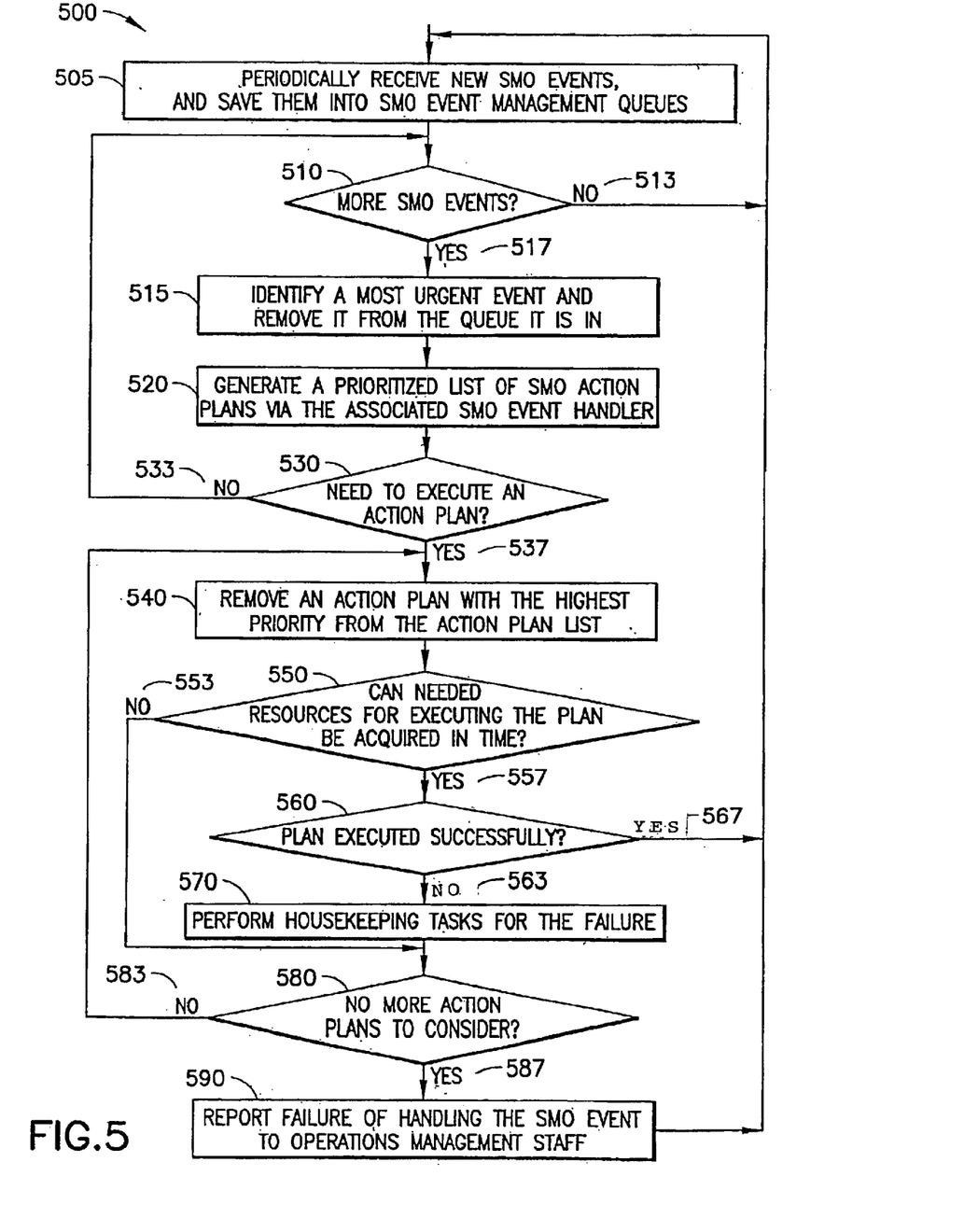
FIG. 5 is a flow chart showing one preferred series of method steps performed by the SLA Management Object (SMO) components of the disclosed e-business SLA manager that track SLA-specific service-level management events generated by CSEM according to each of the respective SLA contracts, and notify one or more operations management staff and/or one or more service management agents of those events when necessary.

FIG. 5 is a flow chart showing one preferred series of method steps performed by the SLA Management Objects (SMOs) components of the disclosed e-business SLA manager that track SLA-specific service-level management events (i.e., SMO events) generated by CSEM according to each of the respective SLA contracts, and notify one or more operations management staff and/or one or more service management agents of those events when necessary. There is one and only one SMO in the SLA Manager for each established SLA contract. By executing process 500, a SMO prioritizes the processing of SLA-specific service-level management events, determines and executes service management actions (with support for planned and/or on-demand change of QoS assurances and service-level management tasks), and manages its computing and people resources per provider-determined SLA management objectives for the associated SLA contract. Besides themselves, the SMOs may use one or more service system management agents and/or one or more operations management staff to execute the service management actions.

The process begins with step 505, in which SMO periodically receives and logs new SMO events and save them into SMO event management queue. SMO then enters loop 510 where each iteration of the loop (via branch 517) processes a queued SMO event. The loop is controlled by step 510, which tests whether or not all of the SMO event management queues are empty. If there is an event in the queues, branch 517 is taken. After all of the queued events are processed, the loop terminates and branch 513 is taken.

The queued SMO events are selected for processing based upon their priorities. In step 517, the SMO chooses a most urgent event from the SMO event management queues, and removes it from the queue it is in. In step 520, a SMO event handler is invoked (in accordance with the type of the chosen SMO event) to generate a prioritized list of SMO action plans. Step 530 tests whether or not SMO should follow branch 537 to successfully execute a SMO action plan in response to the chosen event. If the event handler does not generate one or more prioritized SMO action plans, branch 533 is taken.

Loop 580 aims to successfully execute a SMO action plan for the chosen event. The loop terminates when such an attempt succeeds (branch 567) or fails (branch 587). The loop starts with step 540, in which an action plan with the highest priority is chosen and removed from the action plan list. In step 550, SMO figures out the resources it needs to acquire from the Cross-SLA Resource Manager (CSRM) for executing the plan. In the preferred embodiment, each resource allocation request is sent to CSRM with a numeric attribute whose value is a function of estimated amount of profit decrease if the request cannot be honored in a specific period of time. CSRM uses that as a quantitative assessment of the impact on provider's business if the request is rejected, and takes that into account when making resource allocation decisions. In alternative embodiments, the assessment can be made by CSRM (with or without input from the submitting SMO). The assessment function could also include non-monetary parameters such as customer satisfaction related measurements (e.g., number of trouble tickets that have been issued for the SLA), membership class of the SLA customer (e.g., gold customer vs. regular customer), etc.

If SMO cannot acquire all of the needed resources in time in step 550, branch 553 is taken to drop the current action plan and SMO attempts the execution of another one. If resource requirements for executing the chosen action plan can be satisfied, branch 557 is taken and SMO tries to execute the plan in step 560. If the execution fails, branch 563 is taken, and SMO attempts the execution of another action plan after performing housekeeping tasks for the failure. If none of the action plans can be executed successfully (i.e., when branch 587 is taken), SMO reports failure of handling the SMO event to operations management staff.

Figures 6, 6A:
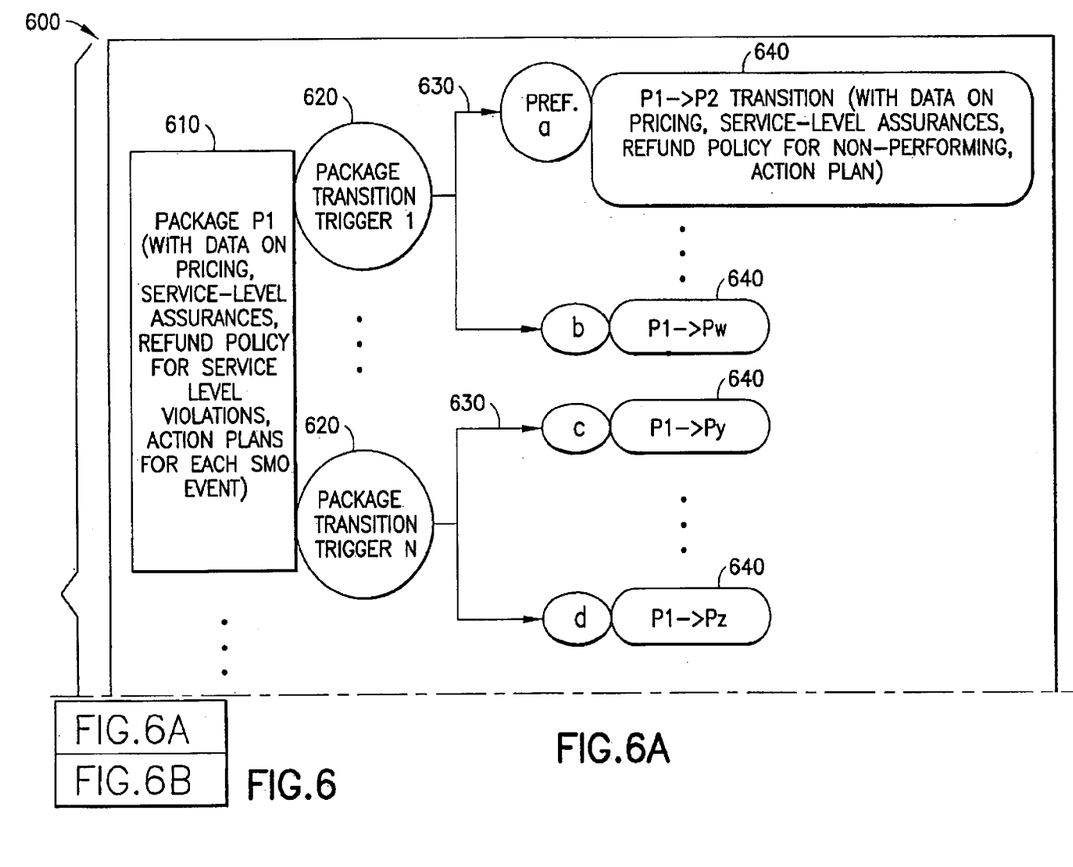
FIG. 6 illustrates the high-level SLA management data model used by the SMO component of the disclosed e-business SLA manager.
Figure 6B:
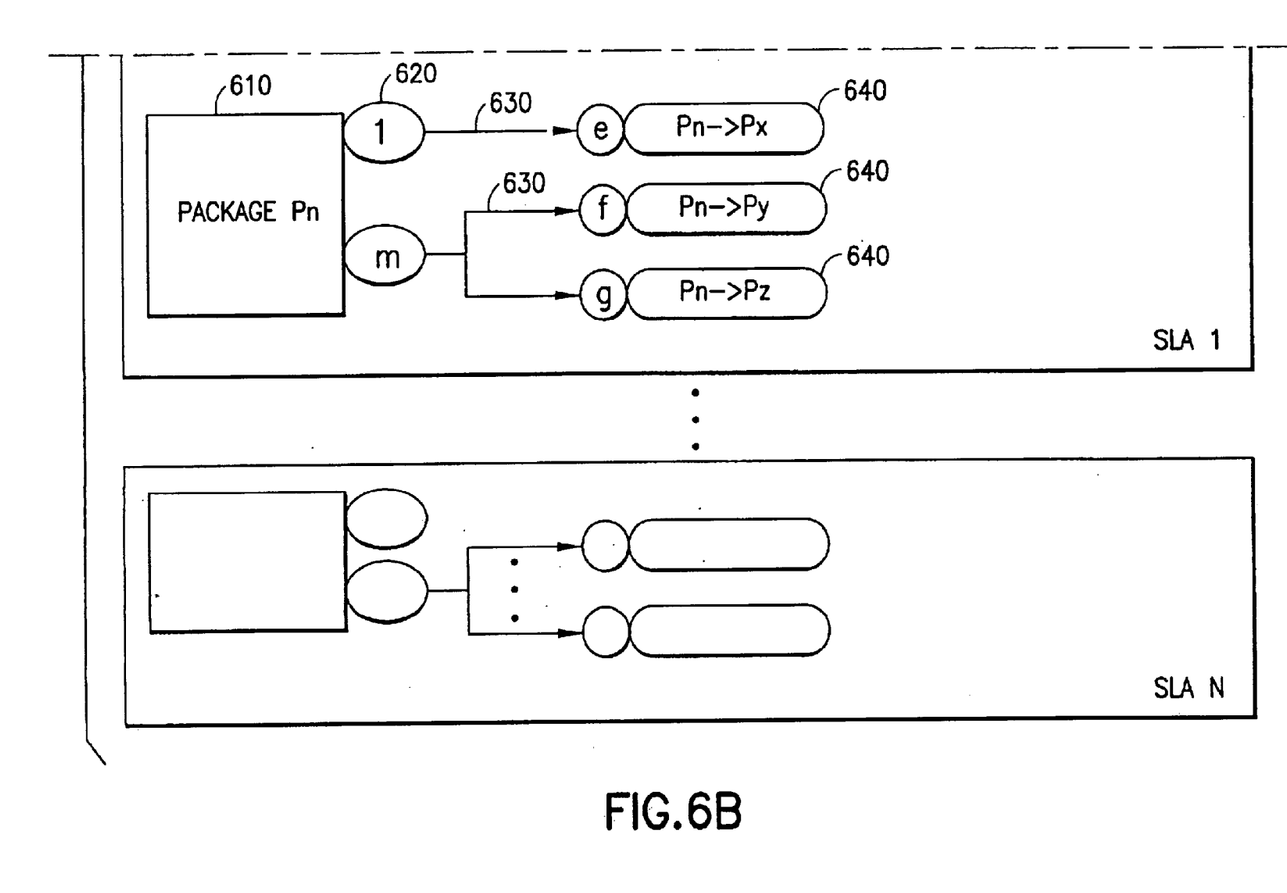

FIG. 6 illustrates the high-level SLA management data model used by the SMO component of the disclosed e-business SLA manager. In the SMO data model, a SLA comprises one or more Service Packages (610), each of which captures terms and conditions (e.g., service function requirements, service-level assurances, refund policy for service-level violations, etc.) for the SLA under various conditions (e.g., time of the day, day of the week, workload conditions, etc.). Each of the Service Packages also captures provider-determined service-level management data like mappings of SMO events to service management action plans. There is only one active Service Package at any time in each SMO. The events and the action plan lists are sent to the operations management staff by SMOs when necessary.

Each of the SLA-specific action plans includes any one or more of the following actions: (1) asking one or more operations management staff to perform one or more service management tasks; (2) increasing and/or decreasing customer support personnel; (3) making planned or on-demand change of QoS assurances and service-level management tasks; and/or (4) installing, reconfiguring, and/or removing (a) one or more hardware components, (b) one or more network routers, (c) one or more communication bandwidth controllers, (d) one or more workload managers, (e) one or more servers, (f) one or more computer software, (g) one or more SLA-specified service-level monitors, and/or (h) one or more provider-owned service-level management monitors.

The SMO data model also includes Service Package Transition Triggers (620) and terms and conditions for handling those triggers. The Service Package transition Triggers enable a SMO to support planned or on-demand change of QoS assurances and service-level management tasks with service-level assurances on the change latency. Each Service Package Transition Trigger is associated with a preference list (630) of Service Package transitions (640). For SLA-specified Service Package Transition Triggers, terms and conditions for handling each of the transitions on the preference list is documented in the SLA (e.g., pricing, QoS assurances, refund policy for non-performing for each of the transitions).

Depending upon terms and conditions in the SLA contact, the provider can also add extra Service Packages and related Triggers to facilitate its management of the QoS-assured service without the customer's awareness. For example, the provider could create Service Packages for planned service maintenance windows to cost-efficiently manage the transitions between normal service offering mode(s) and planned service maintenance mode(s). When the provider is able to support a SLA via more than one sub-SLA (i.e., via integrating third-party services), it can also create a Service Package for each of the sub-SLAs to facilitate its use and management of the QoS-assured services provided by other service providers.

We note that SMO events are either Service-Package-specific service-level management events or Service Package Transition Trigger events. The former are generated mainly to help the provider manage the financial risk of service-level violations, while the latter are created mainly to help the provider to capture profit generation opportunities per customer's need under various conditions. For example, a Web hosting service provider capable of offering a capacity-on-demand service could use the Triggers to support on-demand upgrade and/or degrade of performance related QoS assurances based upon URL access request statistics.

Figure 7:
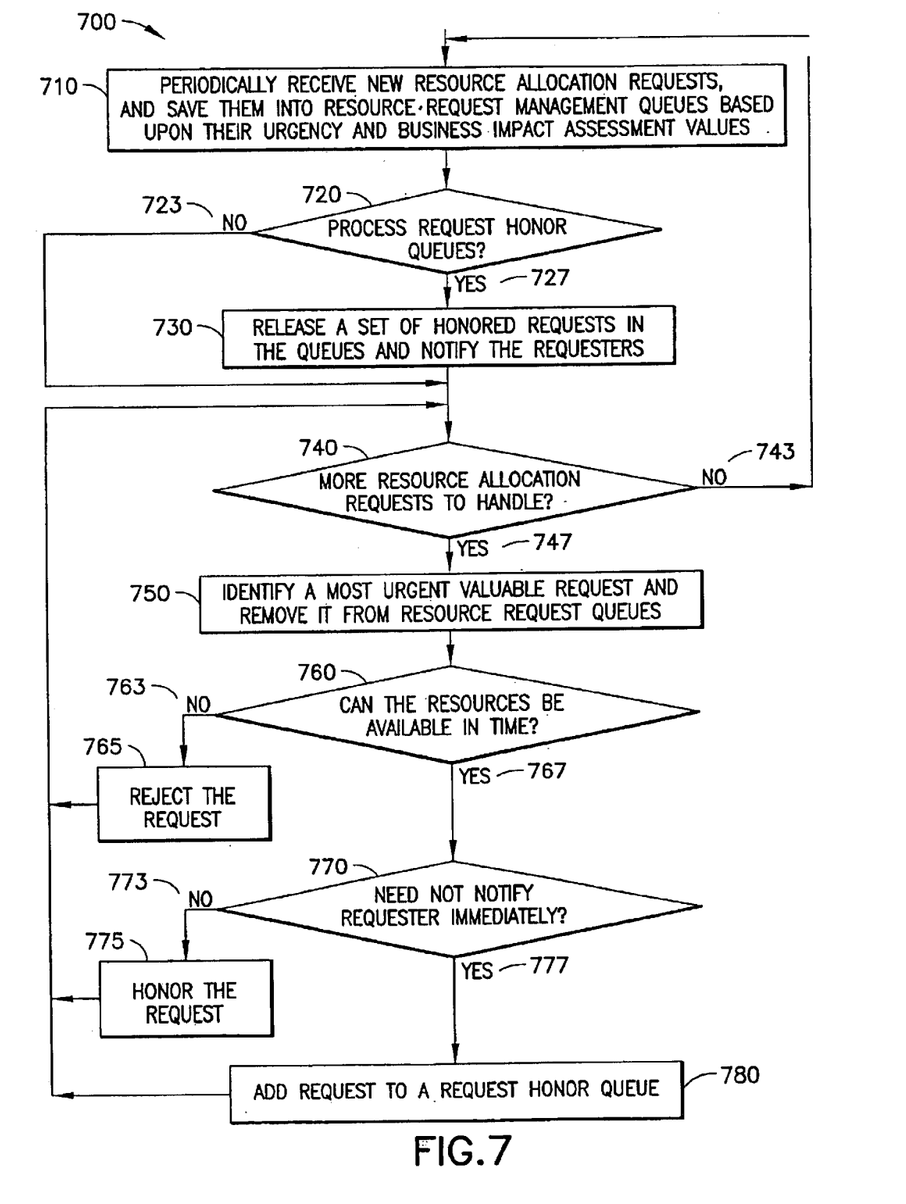
FIG. 7 is a flow chart showing one preferred series of method steps performed by the Cross-SLA Resource Manager component of the disclosed e-business SLA manager for handling allocation requests for SLA management resources.

FIG. 7 is a flow chart showing one preferred series of method steps performed by the Cross-SLA Resource Manager (CSRM) component of the disclosed e-business SLA manager for handling allocation requests for SLA management resources, which include any one or more of the following: (1) one or more operations management staff, (2) one or more customer support personnel, (3) one or more service system management agents, (4) one or more network routers, (5) one or more communication bandwidth controllers, (6) one or more workload managers, (7) one or more servers, (8) one or more computer software, (9) one or more provider-owned service-level management monitors, and (10) one or more computer hardware components.

By executing process 700, CSRM prioritizes the processing of resource allocation requests a submitted by SMOs and manages the allocation of computing and people resources based upon provider-determined business impact assessment metrics. In the preferred embodiment, quantitative assessment for each resource allocation request is performed by the submitting SMO and is sent to CSRM as a numeric attribute of the request. The attribute is a function of estimated amount of profit/revenue decrease if the request cannot be honored in a specific period of time. In alternative embodiments, the assessment can be made by CSRM (with or without input from the submitting SMO). The assessment function could also include non-monetary parameters such as customer satisfaction related measurements (e.g., number of trouble tickets that have been issued for the SLA), membership class of the SLA customer (e.g., gold customer vs. regular customer), etc.

The process 700 begins with step 710 where CSRM periodically receive new resource allocation requests, and save them into CSRM's resource request management queues via a multilevel priority queueing scheme based upon the requests' urgency and business impact assessment values. CSRM then checks if it should process its request honor queues before handling the new set of resource allocation requests in step 720. If none of the queues needs to be processed in the current request processing cycle, branch 723 is taken, otherwise branch 727. In step 730, CSRM releases a set of honored requests from the request honor queues and notifies the request submitters.

The request honor queues enable CSRM to change its previous request honoring decisions for a new resource allocation request per provider-determined cross-SLA resource allocation objectives (e.g., minimizing total profit decrease) and policies (e.g., non-preemptive allocation of resources). They enable CSRM to optimize the usage of e-business SLA management resources per the provider's overall SLA management objectives. Each request honor queue holds a specific class of requests that CSRM has tentatively decided to honor. The decisions are tentative because the requested resources have only been reserved and will not be allocated or released until the submitters are notified. When CSRM must reclaim some of the reserved resources to satisfy the need of a new preferred request, it reclaims all of the resources reserved for the affected requests. After the resource reclamation process is over, CSRM adds the affected requests to its resource request management queues so that they can be handled as new requests in the current request processing cycle.

CSRM rejects or honors a new resource allocation request in each iteration of the loop 740. The loop is controlled by step 740, which tests whether or not there are new resource allocation requests that have not been handled by CSRM. Branch 743 is taken if CSRM has processed all of the new quests, otherwise branch 747 is taken. In step 750, CSRM identifies a most urgent valuable request from its resource request management queues, and removes it from the queues for further processing.

In step 760, CSRM checks if the required resources can be made available to the requester in time per provider-determined cross-SLA resource allocation objectives and policies. Branch 763 is taken if CSRM cannot satisfy the request, otherwise branch 767. In the preferred embodiment, CSRM would send a rejection notification to the request submitter immediately in step 765 if branch 763 is taken. In alternative embodiments, request rejection queues (similar to the request honor queues) could be used to defer the notification process so that CSRM can change its previous request rejection decisions in response to unexpected availability of computing or people resources.

In step 770, CSRM checks if reserved resources for the tentatively honored request should be ff released to the request submitter immediately based upon urgency of the request. Branch 773 is taken if CSRM must honor the request immediately (step 775). If the request can be honored in another request processing cycle, the request is added to a request honor queue (step 780) based upon request response time requirements, type of the request, and business impact assessment value of the request.

Figure 8:
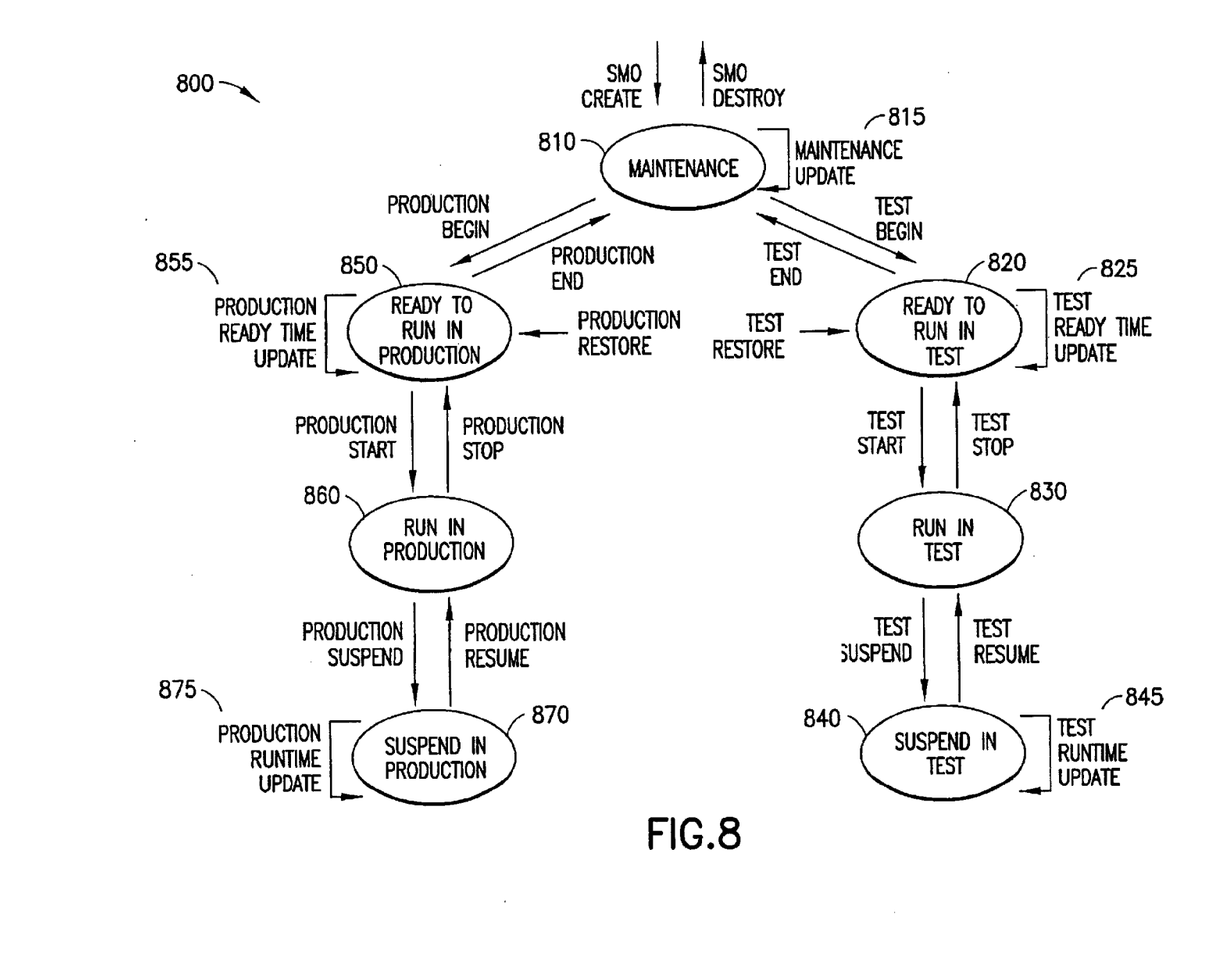
FIG. 8 illustrates how the SMO Manager of the disclosed e-business SLA manager manages the execution of SMOs by controlling the transitions of their states.

FIG. 8 illustrates how the SMO Manager of the disclosed e-business SLA manager manages the execution of SMOs by controlling the transitions of their states. The SMO management actions include any one or more of the following: creating one or more SMOs, making one or more SMOs ready to run in production/test, starting the execution of one or more SMOs in production/test, suspending the execution of one or more SMOs in production/test, resuming the execution of one or more suspended SMOs in production/test, stopping the execution of one or more SMOs in production/test, putting one or more SMOs that are ready to run in production/test into the SMO maintenance mode, and destroying one or more SMOs. The SLA management data in a specific SMO can be updated when the SMO is in the mode of maintenance, ready to run in production/test, or suspend in production/test.

When a SMO is first created, it is in the maintenance state (810). When the managed service is under testing, SMO is in one of the following states: "ready to run in test" (820), "run in test" (830), and "suspend in test" (840). Similarly, when the managed service is in production mode, SMO is in the state of "ready to run in production" (850), "run in production" (860), or "suspend in production" (870). The annotated arrows in the figure show both possible transitions between the states and the main SMO management primitives used by the SMO Manager.

SMO data are initialized when SMO is first created, and can be updated via one of the SMO update primitives: "maintenance update" (815), "test ready time update" (825), "test runtime update" (845), "production ready time update" (855) and "production runtime update" (875). If a SMO terminates its execution unexpectedly (e.g. due to unexpected machine crashes) when the managed service is in testing mode, SMO Manager tries to restore the SMO and restart its execution from the state of "ready to run in test" (820). If the managed service is in production mode, the SMO would restart its execution from the state of "ready to run in production" (850). SMO would establish its links to the other SLA management components in the testing (or production) mode when the "test begin" (or "production begin") primitive is executed, and would tear down the links when "test end" (or "production end") primitive is executed. The service is available in testing or production environment when SMO is in the state of "run in test" (830) or "run in production" (860).

What is claimed is:

1. An e-business service level agreement (SLA) contract management system for managing the operations of QoS-assured e-business service system comprising:
   one or more service-level monitors that monitor a quality measure of one or more monitored systems and generate one or more events when the monitored system does not conform or might soon not conform to the respective quality measure;
   a cross SLA event manager that receives the events and determines which of a plurality of service (SLA) contracts are affected by the events, the SLA contracts governing the use of one or more of the monitored systems; and
   one or more SLA management object (SMO) for each SLA contract that tracks the events according to its respective SLA contracts, and
   a cross-SLA resource manager that determines, based at least in part on a financial impact assessment, how to provide one or more service management resources to meet resource requests from more than one SMO.

2. A SLA contract management system, as in claim 1, where the SMO determines and executes service management actions for every service-level management event received for its respective SLA contract.

3. A SLA contract management system, as in claim 2, where the service management actions include any one or more of the following: installation of a new server, installing computer software, reconfiguring one or more quality measures, notifying a service personnel, and remove a service from the monitored system.

4. A SLA contract management system, as in claim 1, where the SMO determines additional required resources for its respective SLA contract.

5. A SLA contract management system, as in claim 4, where the additional required resources are determined by the provider.

6. A SLA contract management system, as in claim 4, where the additional required resource are determined by the SLA contract.

7. A SLA contract management system, as in claim 1, where the SMO maps the events to actions for its respective SLA contract.

8. A SLA contract management system, as in claim 1, where the quality measures are changed according to data accessed by the SMO.

9. A SLA contract management system, as in claim 1, where the quality measures change according to one of a planned schedule and a demand.

10. A SLA contract management system, as in claim 1, where the events include a SLA specified event.

11. A SLA contract management system, as in claim 10, where the SLA specified events include any one or more of the following: monitored system available, monitored system transaction response time, monitored system service time, monitored system problem resolution response time, network connection bandwidth, and capacity on demand latency.

12. A SLA contract management system, as in claim 1, where the events are a provider determined service level management monitoring events.

13. A SLA contract management system, as in claim 1, where the service level management monitoring events include any one or more of the following: monitored system availability, monitored system transaction response time, monitored system service time, monitored system problem resolution response time, network connection bandwidth, capacity on demand latency, a monitored system trend of one or more of the quality measures.

14. A SLA contract management system, as in claim 1, where the quality measure includes any one or more of the following: monitored system available, monitored system transaction response time, monitored system service time, monitored system problem resolution response time, network connection bandwidth, capacity on demand latency, a monitored system trend of one or more of the quality measures.

15. A SLA contract management system, as in claim 1, where the service management resources include any one or more of the following: one or more service personnel, one or more computing resources, one or more computer programs, and one or more computer hardware components.

16. A SLA contract management system, as in claim 1, where the financial impact assessment comprises one of a business assessment value of each resource allocation request calculated by one or more SMOs, and a business assessment value of each resource allocation request calculated by the cross-SLA resource manager.

17. A SLA contract management system, as in claim 1, further comprising an SMO manager that manages the life cycle of one or more of the SMOs.

18. A SLA contract management system, as in claim 17, where the SMO management includes any one or more of the following: initialization of SMO, linking SMOs to one or more other system components, deleting SMOs, creating SMOs, modifying SMOs, and integrating and managing service system acceptance-testing-time and the production-time activities of the SMOs.

19. A service level agreement SLA contract management method comprising the steps of:

monitoring a quality measure of one or more monitored systems and generating one or more events when the monitored system does not conform or might soon not conform to the respective quality measure;

receiving the events and determines which of a plurality of service (SLA) contracts are affected by the events, the SLA contracts governing the use of one or more of the monitored systems;

tracking the events according to each of the respective SLA contracts; and basing an allocation of resources in response to a plurality of resource requests at least in part on a financial impact assessment of said allocation.

20. A computer program product having a computer-readable media and a program executable to perform the steps of:

monitoring a quality measure of one or more monitored systems and generating one or more events when the monitored system does not conform or might soon not conform to the respective quality measure;

receiving the events and determining which of a plurality of level agreement service (SLA) contracts are affected by the events, the SLA contracts governing the use of one or more of the monitored systems; and tracking the events according to each of the respective SLA contracts; and allocating resources in response to a plurality of resource requests based at least in part on a financial impact assessment of said allocating.

21. An e-business service level agreement (SLA) contract management system for managing the operations of QoS-assured e-business service systems comprising:

means for monitoring a quality measure of one or more monitored systems and generating one or more events when the monitored system does not conform or might soon not conform to the respective quality measure;

means for receiving the events and determining which of a plurality of service (SLA) contracts are affected by the events, the SLA contracts governing the use of one or more of the monitored systems; and means for tracking the events according to each of the respective SLA contracts; and means for allocating resources in response to multiple resource requests based on a financial assessment of the allocating.

\* \* \* \* \*

UNITED STATES PATENT AND TRADEMARK OFFICE
CERTIFICATE OF CORRECTION

PATENT NO. : 6,857,020 B1
DATED : February 15, 2005
INVENTOR(S) : Chaar et al.

It is certified that error appears in the above-identified patent and that said Letters Patent is hereby corrected as shown below:

Column 15,
Line 21, delete "determines" and replace with -- determining --.

Column 16,
Line 6, delete "level agreement".

Signed and Sealed this

Seventeenth Day of May, 2005

JON W. DUDAS
*Director of the United States Patent and Trademark Office*